(12) United States Patent
Chattopadhyay et al.

(10) Patent No.: US 9,798,831 B2
(45) Date of Patent: Oct. 24, 2017

(54) PROCESSING DATA IN A MAPREDUCE FRAMEWORK

(75) Inventors: Biswapesh Chattopadhyay, Sunnyvale, CA (US); Liang Lin, Mountain View, CA (US); Weiran Liu, Mountain View, CA (US); Marián Dvorský, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 782 days.

(21) Appl. No.: 13/078,500

(22) Filed: Apr. 1, 2011

(65) Prior Publication Data

US 2012/0254193 A1   Oct. 4, 2012

(51) Int. Cl.
*G06F 17/30* (2006.01)

(52) U.S. Cl.
CPC .. *G06F 17/30979* (2013.01); *G06F 17/30424* (2013.01)

(58) Field of Classification Search
CPC ......... G06F 17/30424; G06F 17/30979; G06F 17/30598; G06F 17/30699; G06F 9/5066; G06F 17/30206; G06F 3/067; H04L 67/104; H04L 67/1097
USPC ...................................................... 707/747
See application file for complete search history.

(56) References Cited

U.S. PATENT DOCUMENTS

| 5,797,000 A | 8/1998 | Bhattacharya et al. |
| 6,609,131 B1 * | 8/2003 | Zait et al. |
| 7,650,331 B1 * | 1/2010 | Dean et al. ........... 712/203 |
| 8,990,149 B2 * | 3/2015 | Danciu .......... G06Q 10/06 703/2 |
| 2004/0139072 A1 * | 7/2004 | Broder et al. ............... 707/4 |
| 2005/0038784 A1 | 2/2005 | Zait et al. |

(Continued)

FOREIGN PATENT DOCUMENTS

| CN | 101120340 | 2/2008 |
| CN | 101183368 | 5/2008 |

(Continued)

OTHER PUBLICATIONS

"Appengine-mapreduce" [online]. Google, Aug. 2010, [retrieved on Jul. 1, 2011]. Retrieved from the Internet: <URL: http://code.google.com/p/appengine-mapreduce/issues/detail?id=49>. 3 pages.

(Continued)

*Primary Examiner* — Evan Aspinwall
(74) *Attorney, Agent, or Firm* — Fish & Richardson P.C.

(57) ABSTRACT

A computer-implemented method for processing input data in a mapreduce framework includes: receiving, in the mapreduce framework, a data processing request for input data; initiating, based on the data processing request, a map operation on the input data by multiple mappers in the mapreduce framework, each of the mappers using an aggregator to partially aggregate the input data into one or more intermediate key/value pairs; initiating a reduce operation on the intermediate key/value pairs by multiple reducers in the mapreduce framework, wherein, without sorting the intermediate key/value pairs, those of the intermediate key/value pairs with a common key are handled by a same one of the reducers, each of the reducers using the aggregator to aggregate the intermediate key/value pairs into one or more output values; and providing the output values in response to the data processing request.

21 Claims, 4 Drawing Sheets

(56) References Cited

U.S. PATENT DOCUMENTS

| | | | |
|---|---|---|---|
| 2005/0187977 | A1 | 8/2005 | Frost |
| 2006/0116989 | A1* | 6/2006 | Bellamkonda .... G06F 17/30489 |
| 2006/0218123 | A1 | 9/2006 | Chowdhuri et al. |
| 2008/0086442 | A1* | 4/2008 | Dasdan et al. ................. 707/1 |
| 2009/0055439 | A1 | 2/2009 | Pai et al. |
| 2009/0313635 | A1* | 12/2009 | Dasdan ...................... 718/105 |
| 2010/0005080 | A1* | 1/2010 | Pike et al. ..................... 707/4 |
| 2010/0122065 | A1 | 5/2010 | Dean et al. |
| 2011/0047172 | A1 | 2/2011 | Chen et al. |
| 2011/0055243 | A1* | 3/2011 | Kunnummal ............... 707/769 |
| 2011/0072006 | A1 | 3/2011 | Yu et al. |
| 2011/0302151 | A1 | 12/2011 | Abadi et al. |
| 2011/0302583 | A1* | 12/2011 | Abadi et al. ................. 718/102 |
| 2012/0110004 | A1* | 5/2012 | Meijer ......................... 707/769 |
| 2012/0151292 | A1* | 6/2012 | Rowstron ............ G06F 9/5066 714/748 |

FOREIGN PATENT DOCUMENTS

| | | |
|---|---|---|
| CN | 101692651 | 4/2010 |
| CN | 101888405 | 11/2010 |
| CN | 101957863 | 1/2011 |

OTHER PUBLICATIONS

Bara et al. "Improving query performance in virtual data warehouses," *WSEAS Transactions on Information Science and Applications*, 2008 World Scientific and Enginerring Academy and Society, 2008, 5(5):632-641.

Chattopadhyay et al. "Tenzing a SQL Implementation on the MapReduce Framework," The 37th International Conference on Very Large Data Bases, *Proceedings of the VLDB Endowment*, 2011, 4(12):1318-1327.

Chen. "Cheetah: a high performance, custom data warehouse on top of MapReduce," *Proceedings of the VLDB Endowment*, 2010, 3(1-2):1459-1468.

Dean and Ghemawat, "MapReduce: Simplified Data Processing on Large Clusters." Google, Inc., 2004, 13 pages.

Fokkinga, "MapReduce—a two-page explanation for laymen." Dec. 5, 2008, 2 pages.

Ghemawat et al. "The Google File System." Google, Inc., 2003, 15 pages.

Jiang et al. "Optimization of multi-join query processing within MapReduce," Universal Communication Symposium (IUCS), 2010 4th International, 2010, pp. 77-83.

Lammel. "Google's MapReduce Programming Model—Revisited," *Science of Computer Programming*, 2007, 70(1):1-30.

McFadyen , "Data Warehousing." ACS-3902, 2010, 22 pages.

Pavlo et al. "A Comparison of Approaches to Large-Scale Data Analysis." 2009, 14 pages.

"Performance of DB2 Information Integrator in a J2EE Environment with Multiple Data Sources" [online]. DeveloperWorks, IBM, 2003, [retrieved on Jul. 1, 2011]. Retrieved from the Internet: <URL: http://www.ibm.com/developerworks/data/library/techarticle/0306saracco1/0306saracco1.html>. 16 pages.

"Sort-merge join" [online]. Wikipedia, The Free Encyclopedia 2010, [retrieved on Jul. 1, 2011]. Retrieved from the Internet: <URL: htip://en.wikipedia.org/wiki/Merge_join>. 4 pages.

"-Thanks for the question regarding "hash partitioning", version 8.1.7" [online]. Oracle, Ask Tom, 2001, [retrieved on Jul. 1, 2011]. Retrieved from the Internet: <URL: http://asktom.oracle.com/pls/asktom/f?p=100:11:0::::P11_QUESTON_ID:981835183841>. 21 pages.

Yang and Dasdan. "Map-Reduce-Merge: Simplified Relational Data Processing on Large Clusters," SIGMOD' 07, *ACM*, 2007, pp. 1029-1040.

Authorized Officer C. Dumitrescu. International Search Report and Written Opinion in International Application No. PCT/US2012/030897, dated Jun. 19, 2012, 12 pages.

Authorized Officer C. Dumitrescu. International Search Report and Written Opinion in International Application No. PCT/US2012/030941, dated Jul. 10, 2012, 15 pages.

International Preliminary Report on Patentability in International Application No. PCT/US2012/030897, dated Oct. 1, 2013, 7 pages.

\* cited by examiner

PROCESSING DATA IN A MAPREDUCE FRAMEWORK

TECHNICAL FIELD

This document relates to data processing in a mapreduce framework.

BACKGROUND

The MapReduce model was developed at Google Inc. as a way to simplify large-scale data processing. Implementations of a mapreduce procedure are done according to the MapReduce model.

SUMMARY

In a first aspect, a computer-implemented method for processing input data in a mapreduce framework includes: receiving, in the mapreduce framework, a data processing request for input data; initiating, based on the data processing request, a map operation on the input data by multiple mappers in the mapreduce framework, each of the mappers using an aggregator to partially aggregate the input data into one or more intermediate key/value pairs; initiating a reduce operation on the intermediate key/value pairs by multiple reducers in the mapreduce framework, wherein, without sorting the intermediate key/value pairs, those of the intermediate key/value pairs with a common key are handled by a same one of the reducers, each of the reducers using the aggregator to aggregate the intermediate key/value pairs into one or more output values; and providing the output values in response to the data processing request.

In a second aspect, a computer program product tangibly embodied in a computer-readable storage device includes instructions that when executed by a processor perform a method for processing input data in a mapreduce framework. The method includes: receiving, in the mapreduce framework, a data processing request for input data; initiating, based on the data processing request, a map operation on the input data by multiple mappers in the mapreduce framework, each of the mappers using an aggregator to partially aggregate the input data into one or more intermediate key/value pairs; initiating a reduce operation on the intermediate key/value pairs by multiple reducers in the mapreduce framework, wherein, without sorting the intermediate key/value pairs, those of the intermediate key/value pairs with a common key are handled by a same one of the reducers, each of the reducers using the aggregator to aggregate the intermediate key/value pairs into one or more output values; and providing the output values in response to the data processing request.

In a third aspect, a system includes: at least one processor; and at least one computer-readable storage device comprising instructions that when executed cause performance of a method for processing input data in a mapreduce framework. The method includes: receiving, in the mapreduce framework, a data processing request for input data; initiating, based on the data processing request, a map operation on the input data by multiple mappers in the mapreduce framework, each of the mappers using an aggregator to partially aggregate the input data into one or more intermediate key/value pairs; initiating a reduce operation on the intermediate key/value pairs by multiple reducers in the mapreduce framework, wherein, without sorting the intermediate key/value pairs, those of the intermediate key/value pairs with a common key are handled by a same one of the reducers, each of the reducers using the aggregator to aggregate the intermediate key/value pairs into one or more output values; and providing the output values in response to the data processing request.

Implementations can include any or all of the following features. The data processing request identifies a number of keys in the input data, and the method further includes performing a size evaluation of the identified number of keys with regard to a size of the input data, wherein the map and reduce operations using the aggregator are selected for initiation based on the size evaluation. The mappers and reducers are implemented using a cluster of machines, wherein the size evaluation takes into account memory space of one or more of the machines. The size evaluation takes into account whether the identified number of keys is three orders of magnitude smaller than the size of the input data. The aggregator in the map and reduce operations uses a hash table. The aggregator is based on a commutative and associative aggregate function.

Implementations can provide any or all of the following advantages. High-performance aggregation of queries can be performed. A generic aggregator can be used on both the map side and the reduce side of the framework. The aggregator can perform aggregation continuously (e.g., as soon as each new value becomes available). The need to sort key/value pairs for the reduce operation can be eliminated. Memory usage can be reduced by keeping only an aggregated value for a given key in memory. A mapreduce framework can be reused, for example by disabling a sorter and adding the generic aggregator. A requirement that all values for the same key must go to the same reduce call can be relaxed or eliminated. The aggregator can replace a combiner on the map side. Aggregation can be performed using a hash table.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which processing of input data in a mapreduce framework can be done using a generic aggregator on both the map side and the reduce side, without the need to sort the intermediate data before the reduce operation. In some implementations, the approach using the generic aggregator can be used based on evaluating relative sizes of the input data and of keys involved in processing the input data. For example, when only relatively few keys are sought in a comparably large volume of data (e.g., the number of words is at least one thousand times larger than the number of keys), the values for the keys can be aggregated in the map operation and key/value pairs having the same key can be forwarded to the same reducer. The reducer can then use the same generic aggregator in the reduce operation. This can significantly reduce a volume of intermediate data passed from the map operation to the reduce operation, and can eliminate the need to sort the intermediate data for the reduce operation.

Figure 1:
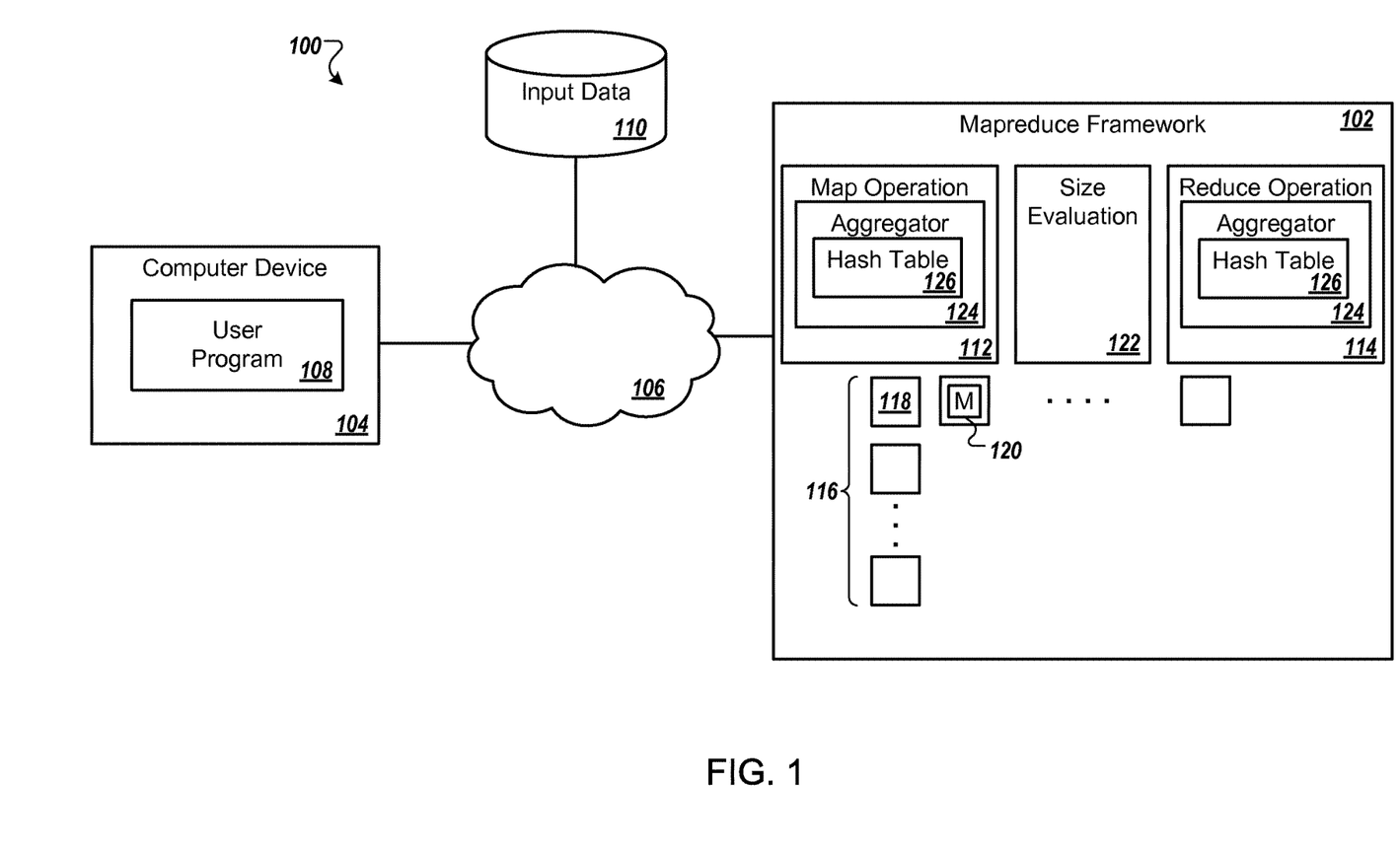
FIG. 1 shows an example of a system with a mapreduce framework.

FIG. 1 shows an example of a system 100 with a mapreduce framework 102. The mapreduce framework 102 can be used to perform data processing according to the mapreduce model, for example to perform certain types of analysis on large volumes of data. As used in this document, the term "mapreduce framework" refers to a system that is configured to perform (i) at least one map operation that generates one or more intermediate key/value pairs from input data; and (ii) at least one reduce operation that generates one or more output values from the intermediate key/value pairs. The mapreduce framework divides the map operation among multiple program components (sometimes called "workers") and assigns one or more map tasks to each worker. The mapreduce framework divides the reduce operation into reduce tasks and assigns them to workers. In some implementations, the mapreduce framework is run on a cluster of processing devices such as a network of commodity PCs.

Here, a user can employ a computer device 104 to access the mapreduce framework through any type of network 106, such as the internet or a network for mobile devices (e.g., a cellular phone network). Mapreduce processing can be initiated by a user program 108 on the computer device. In some implementations, an organization that serves advertisements can use the program 108 to analyze volumes of data that are relevant to one or more aspects of advertising. For example, the mapreduce operations can determine reverse hyperlinking for each of hundreds of millions of online pages or more, meaning all pages that link to a given page are to be detected. In such situations, the user program 108 defines the group of relevant target pages and to specify that the corresponding source pages are being sought. As another example, the mapreduce operations can process a log of requests for online pages to determine how many times each of the pages has been requested. In that situation, the user program 108 identifies or otherwise defines the relevant log (e.g., by date, or any other restriction), and specifies that the number of requests per page is being sought.

In some implementations, the user program 108 is configured so that the user can formulate one or more queries (e.g., using Structured Query Language (SQL)) to be performed on some or all of a collection of information stored as input data 110. The input data can include any suitable information that can be processed in the mapreduce framework 102. In some implementations, some or all of the input data 110 is gathered by an advertisement-serving organization, such as by logging online requests of associated users, by registering queries entered into a search engine, and/or by automatically crawling pages available on the internet. For example, and without limitation, the input data 110 can include network data, sales data, observational data, scientific data, random data, population data, artistic data, statistical data, and combinations thereof. For situations in which the systems discussed here rely on personal information (e.g., query history) about users, the users may be provided with an opportunity to opt in/out of programs or features that may collect the personal information. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user. As another example, user queries stored in query logs may be deleted after a predetermined period of time.

The input data can have any data format that is suitable for the mapreduce operations, including, but not limited to, a binary data format, a plain text format, a markup-language format (e.g., XML), or an image format.

The mapreduce framework 102 includes a map operation 112 and a reduce operation 114. In some implementations, the map operation 112 is configured for processing some or all of the input data 110 and generating at least one intermediate key/value pair therefrom. In some implementations, the reduce operation 114 is configured for processing at least part of the intermediate key/value pair(s) and generating at least one output value therefrom. In general, the map operation 112 can detect the occurrences, in the input data 110, of each of multiple keys, and the reduce operation 114 can sum or otherwise aggregate data from such detections into useful output information (e.g., a table of occurrence frequencies).

The map operation 112 and/or the reduce operation 114 can be performed as tasks distributed to one or more processors. In some implementations, the mapreduce framework 102 includes, or otherwise works in connection with, a cluster 116 of processing units, such as machines 118. For example, each machine 118 can be a commodity device (e.g., a PC) and they can be networked using any suitable communication protocol (e.g., Ethernet). Each of the machines 118 has at least one memory 120, either integrated in the device or communicatively coupled thereto by an appropriate connection (e.g., a system bus). For example, the memory 120 is used in detecting occurrences of keys in the input data 110, and/or in summing data for generating the output information.

The mapreduce framework 102 includes a size evaluation function 122. In some implementations, the size evaluation function 122 compares the size of the input data 110 to the number of keys involved in the processing. For example, the size of a data repository can be compared to the number of distinct words or letters that are being sought.

If the number of keys is sufficiently small compared to the data volume, the mapreduce framework 102 can make use of one or more aggregators 124 during performance of the map operation 112 and the reduce operation 114. The aggregator 124 can be based on any commutative and associative aggregation function, including, but not limited to MAX, MIN, COUNT or SUM. For example, for each word or letter in the input data 110 the aggregator 124 in the map operation 112 can increment an associated value that counts the occurrences. As another example, the aggregator 124 in the reduce operation 114 can sum up, or otherwise aggregate, the values for intermediate key/value pairs having the same key. Examples of size relationships between the keys and the data are discussed below.

In some implementations, at least one hash table 126 can be used in the map operation 112 or in the reduce operation 114, or both. For example, the hash table can store keys and a count value for each key. Upon each successive key being identified in the map operation 112, the hash table can be updated to increment the corresponding value(s). In the reduce operation, the hash table 126 can be used by each reducer to aggregate (e.g., add) the values for each particular key.

Figure 2:
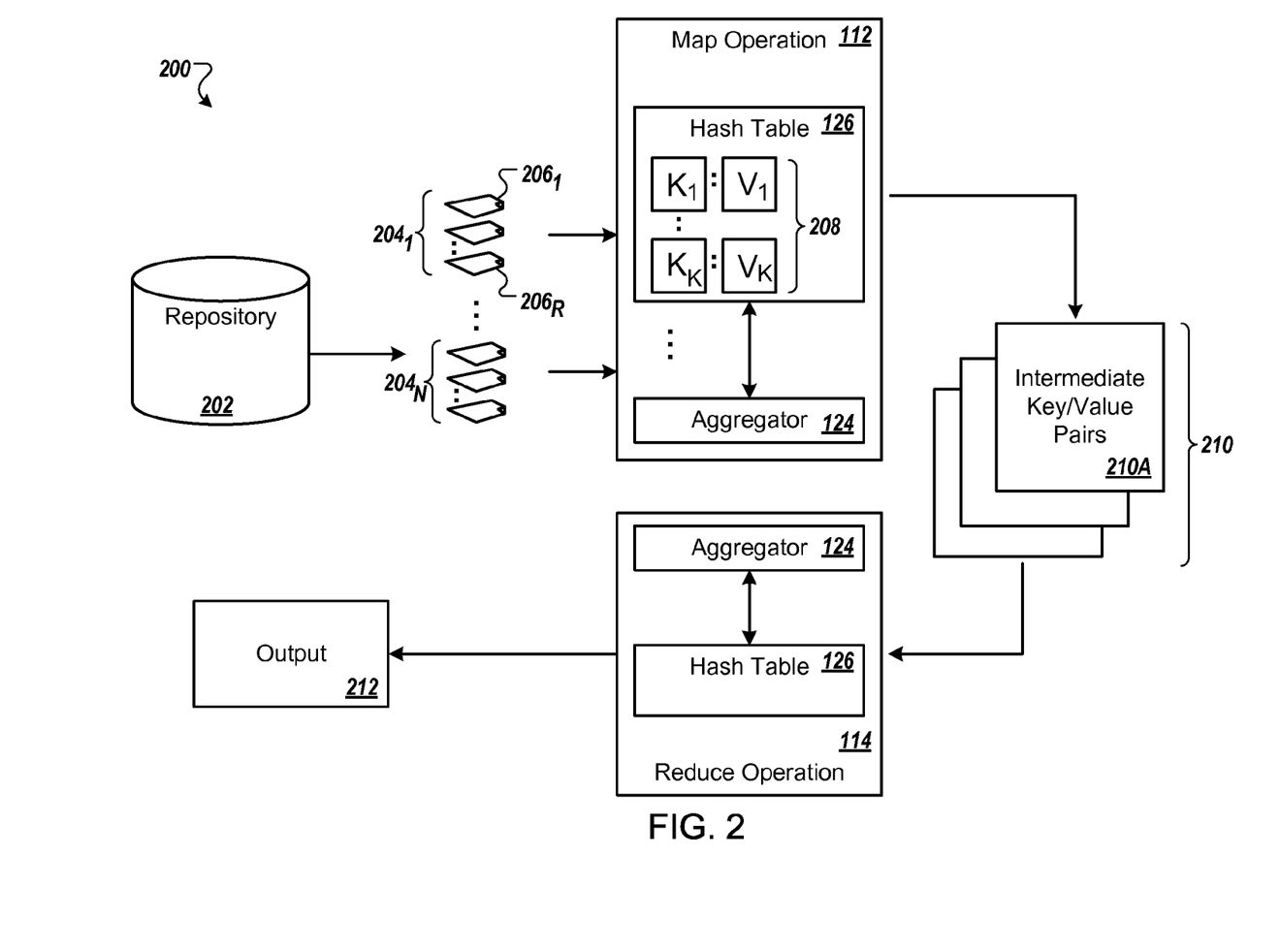
FIG. 2 schematically shows an example of processing input data in a mapreduce framework.

FIG. 2 schematically shows an example of processing input data in a mapreduce framework. In some implementations, a process 200 can be performed using one or more features from the system 100 (FIG. 1). For example, the process 200 can be performed in the mapreduce framework 102 (FIG. 1).

Here, assume that a request for processing has been received regarding a repository 202, which is an information collection of very large proportions. In some implementations, the repository 202 includes trillions (i.e., $10^{12}$) bytes (also referred to as terabytes) of data or more. As illustrative examples only, the repository 202 can correspond to one or more years' worth of gathered online data, or an electronic version of the literature stored in the Library of Congress. Also, the processing request specifies that what is being sought is the occurrence of some specific keys in this mass of information, say, the words or even each separate letter in the data.

Before processing begins, a size evaluation can be performed. For example, if the frequency determination is to be done at a word level, then the evaluation should take into account the total number of words that will be detected and registered. Such a number may or may not be known with certainty before actually processing the data, but in some implementations as estimation can be made. In some implementations, assuming that the repository 202 contains information in only a single language (e.g., in English or in Hindi), then an approximation of the total number of words in that language can be used as a rough estimate of the maximum number of keys. For example, some common estimates of the number of words in the English language are in the range of several hundred thousand to over a million words. Accordingly, a general estimate of the total number of keys when counting English words can be said to be proportional to $10^5$ to $10^6$ words.

As another example, if the frequency of each letter from the Latin alphabet in the repository 202 is to be determined, then the total number of keys would be twenty-six. Using the numerical notion from the previous example, a general estimate of the total number of distinct keys can be said to be proportional to $10^1$ (i.e., ten).

The size evaluation can compare the size of the repository 202 to the total number of distinct keys. Table I shows examples of such evaluations and of the determined difference or relationship in size.

TABLE I

| Example input data | Size of input data | Counting by | Total number of distinct keys | Ratio |
|---|---|---|---|---|
| Arbitrary data volume | $S_{ID}$ | Arbitrary key | $K_d$ | $S_{ID}/K_d$ |
| Repository 202 | $10^{12}$ bytes | Letter | 10 bytes (approx.) | about $10^{11}$ |
| Repository 202 | $10^{11}$ words | Word | $10^5$ to $10^6$ words (approx.) | about $10^6$ to $10^5$ |

The size evaluation can take into account whether the relatively small additional task of incrementing a value on the map side is significantly outweighed by the savings of resources and/or time that can be obtained, for example by using a generic aggregator in the map and reduce sides, and/or by not having to sort the key/value pairs.

In the examples of Table I, the ratio is at least $10^5$, meaning that the size of the input data is at least five orders of magnitude larger than the number of distinct keys being sought in that data. In some implementations, a size difference of about three or more orders of magnitude or more is considered sufficient. For example, a ratio of about $10^3$ would be accepted but a ratio of about $10^2$ or less would not.

In some implementations, the size evaluation takes into account whether the reduce operation could be performed using the memory space of a single one of the machines in the cluster.

In the current example, the size evaluation leads to the choice of using a generic aggregator, with a corresponding elimination of a reduce-side sorting. Accordingly, the reduce operation will here perform non-sorted aggregation. In contrast, if the generic-aggregator approach had not been chosen (e.g., because the ratio was too low and/or due to memory restrictions), then a traditional mapreduce operation can be performed. For example, in such situation a sorting of the intermediate data is performed, and the reduce operation performs a sorted aggregation.

Before the map operation is performed, the repository 202 can be divided into M range shards $204_1$-$204_M$. In some implementations, the range shards $204_1$-$204_M$ can be generated so that the size of each one meets at least one chosen criterion (e.g., that each shard be about 16-64 megabytes). For example, this sharding can be done to facilitate distribution of the map operation among multiple machines in a cluster.

Each of the range shards 204 consists of one or more sections $206_1$-$206_R$, which can correspond to individual records (e.g., documents or pages) or to arbitrarily apportioned data amounts, for example in the range of 16-64 megabytes each. The map functions then begin processing the range shards 204.

The map operation 112 here uses the aggregator 124 and the hash table 126 to process the input data. For each word or letter detected in the range shard $204_1$, a corresponding entry in the hash table 126 can be updated. For example, when K distinct keys are being sought, the hash table 126 can include entries $K_1$-$K_K$, each one corresponding to a respective one of the keys. Moreover, the hash table 126 can include one or more values for each of the keys being sought. Here, entries $V_1$-$V_K$ are included next to a corresponding one of the keys. For example, the first time that the key $K_1$ is found in the range shard $204_1$, the value $V_1$ is set to an initial value (e.g., to one). Similarly, the second time that the key $K_1$ is found in that shard, the value $V_1$ is updated in a corresponding way (e.g., incremented by one). Thus, after such increment the value $V_1$ would be two in the above example, indicating two detected occurrences of the corresponding key.

In some implementations, each map function has its own version of the hash table 126, where the keys detected by that map function are registered and the respective values are updated accordingly. In some implementations, a separate one of the hash table 126 is used for each of the range shards 204. In some implementations, a single one of the hash table 126 is used for the entire repository 202.

The result of the map operation is one or more intermediate key/value pairs 210. In some implementations, each machine in the map operation generates a set of the intermediate key/value pairs 210 for every map task completed. The intermediate key/value pairs 210 are generated so that their information can be aggregated in the reduce operation. Table II shows a few examples of the key/value pairs 210 when occurrences of English words are detected:

TABLE II

| Key | Value |
| --- | --- |
| a | 1,309,708,523 |
| aback | 23,492 |
| abacus | 47 |
| ... | ... |

Similarly, Table III shows a few examples of the key/value pairs 210 when occurrences of characters in the Latin alphabet are detected:

TABLE III

| Key | Value |
| --- | --- |
| a | 121,344,706,709 |
| b | 22,130,185,189 |
| c | 41,289,875,722 |
| ... | ... |

The pairs in Tables II and/or III above can be considered a value aggregation. For example, Table II indicates that 23,492 occurrences of the key "aback" have been detected, and this entry therefore serves in lieu of 23,492 individual (aback, 1) pairs. Similarly, the entry for the key "b" in Table III, which entry in this example is about a dozen bytes long, takes the place of over 22 billion individual (b, 1) pairs, and essentially avoids storing and sorting gigabytes of data, in this example. The contents of Tables II and/or III can be included in the particular intermediate key/value pair record 210A that is part of the overall intermediate key/value pairs 210.

The intermediate key/value pairs 210 are forwarded to the reduce operation 114. Here, the reduce operation 114 uses the same aggregator (e.g., the aggregator 124) or an equivalent aggregator as the map operation 112. Similarly, the reduce operation 114 uses the same hash table (e.g., the hash table 126) or an equivalent hash table as the map operation 112. In some implementations, the particular intermediate key/value pair record 210A is a reduce shard generated to distribute the total volume of reduce operations among some or all of the machines in the cluster 116 (FIG. 1). Accordingly, each reduce shard among the intermediate key/value pairs 210 can be assigned as a separate reduce task. In such implementations, those of the intermediate key/value pairs 210 that have the same key are assigned to the same reduce shard. For example, the tallies for the key "aback" from all mappers can be gathered in the same reduce shard, or similarly for the key "b". In other implementations, only a single reduce shard is used for all of the reduce operations on the intermediate key/value pairs 210.

The reduce operation 114 aggregates the values from the intermediate key/value pairs 210 according to one or more definitions in a corresponding reduce function. In some implementations, the respective tallies for each distinct key from all mappers can be summed. For example, Table IV shows an addition by the reduce operation 114:

TABLE IV

| Key | Value |
| --- | --- |
| b | 2,600,129,299 |
| b | 22,130,185,189 |
| ... | ... |
| b | 1,899,338,921 |
| Total | 345,431,889,021 |

An aggregation such as the one in Table IV is done for each distinct key that was detected in the repository 202. For example, a grand total of detected occurrences can be generated for each letter in the Latin alphabet, or for each detected word.

The result of the reduce operation 114 is at least one output 212. In some implementations, the output is generated as one or more files of information, organized according to the data processing request that prompted the search, and stored in a suitable file format. For example, a report can be generated in response to a query submitted from the computer device 104 (FIG. 1). In some implementations, such report (or other output) can be displayed or otherwise presented by the user program 108 (FIG. 1).

Other forms of aggregation can be performed in lieu of, or in addition to, the above summation. In some implementations, any commutative and associative aggregate function can be used (performed, e.g., upon detection of each key in the input data). As particular examples, a MAX, MIN, COUNT and/or SUM function can be used.

Figure 3:
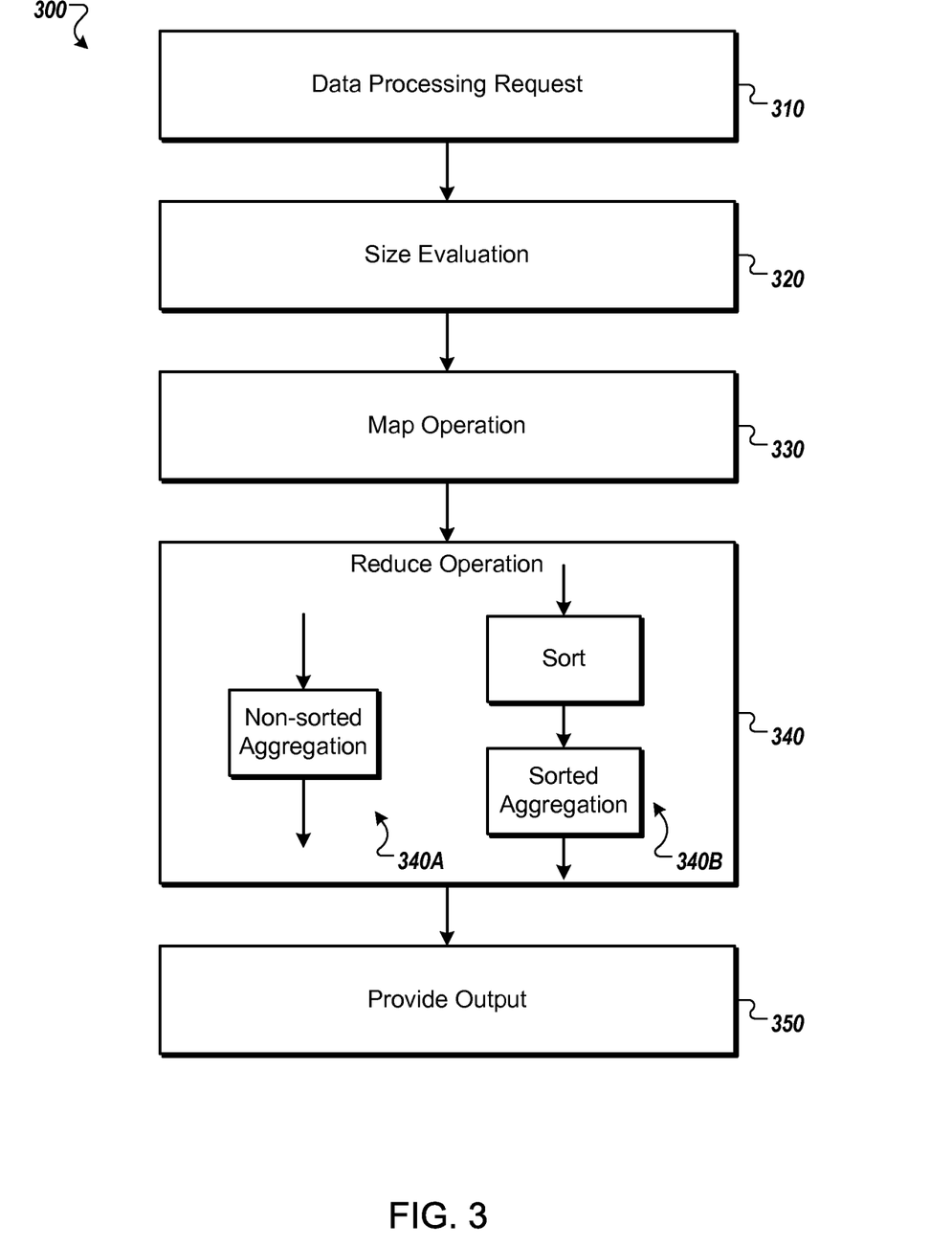
FIG. 3 is a flowchart of an example method.

FIG. 3 is a flowchart of an example method 300. The method 300 can be performed by one or more processors executing instructions stored in one or more computer-readable storage devices, for example in the system 100 (FIG. 1). In some implementations, two or more of the operations in the method 300 can be performed in a different order than here. While example steps of the method 300 are shown here, one or more additional steps can be performed before, in between and/or after the shown steps.

At 310, a data processing request is received or otherwise detected. In some implementations, the computer device 104 (FIG. 1) can generate a data processing request regarding some or all information in the input data 110 (FIG. 1). For example, the data processing request can include the information and commands for initiating a reverse-hyperlinking determination or a page request count.

At 320 a size evaluation is performed, for example by the size evaluation function 122 (FIG. 1). As a result of the size evaluation, it is determined whether at least one criterion regarding generic aggregation has been met. In some implementations, the criterion or criteria determine whether generic aggregator should be used in both the map and reduce operations, and reduce-side sorting should be disabled. For example, it can be determined whether a reduce operation can be performed using the memory space of a single machine in the cluster. As another example, it can be determined whether the identified number of keys is at least about three or more orders of magnitude smaller than the size of the input data.

At 330, the map operation is performed. For example, each word or character in the data can be selected and a hash table can be incremented for the corresponding key. The current value for the detected key is incremented by a predefined amount, or if this is the first occurrence, an entry for the key is created and associated with an initial value. The hash table is updated as soon as the next key is found. In short, the map operation 330 does not generate a separate key/value pair for each occurrence of the key, but rather aggregates the values per key.

The above operations generate an intermediate result, such as key/value pairs, that obviates the need for sorting at the reducer side. Accordingly, a sorting function in the reduce operation 114 (FIGS. 1, 2) can be deactivated or disabled.

At 340, a reduce operation is performed. The reduce operation in this example has branches 340A and 340B. In some implementations, if the size evaluation at 320 leads to the use of a generic aggregator, then the branch 340A is chosen in the reduce operation. The branch 340A includes at least one non-sorted aggregation of the shuffle data, for example to add the values associated with a common key.

In contrast, if the size evaluation at 320 does not lead to use of the generic aggregator, then the branch 340B is chosen in the reduce operation. The branch 340B includes at least one sorting operation and at least one sorted aggregation. Sorting on the aggregate keys during shuffle can require a significant amount of processing resources, particularly if the characteristics of the input data and the aggregated keys are such that the entire set of pairs cannot be held in memory by a single cluster machine. The branch 340A eliminates the need for the sorting and may therefore be more efficient, faster, and/or less resource-demanding, in some circumstances.

At 350, one or more outputs of the mapreduce process are generated. In some implementations, a report can be generated for the data processing request (310). For example, the report can include a file of any suitable format (e.g., XML, plain text) with a response to the user's query (e.g., the addresses of all referring pages or the count values for requested pages).

Figure 4:
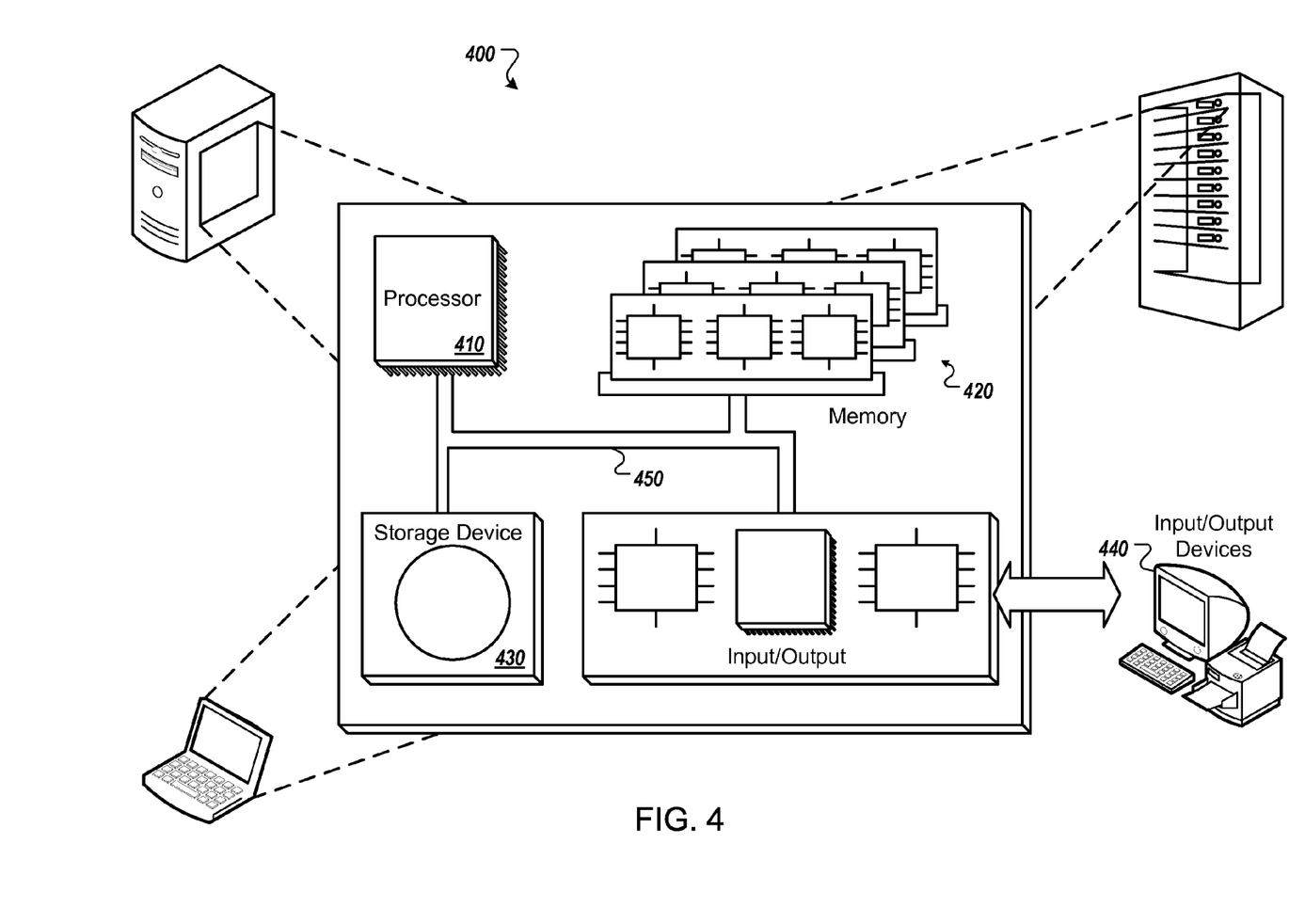
FIG. 4 is a block diagram of an example computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and one or more input/output devices 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for processing input data in a mapreduce framework, the method comprising:

receiving, in the mapreduce framework, a data processing request for input data;
performing a size evaluation of a number of keys with regard to a size of the input data;
selecting, from a pool of available formats of storage of intermediate keys/value pairs, a format based on the size evaluation, wherein:
  intermediate keys/value pairs are sorted in at least one of the available formats of storage; and
  intermediate keys/value pairs are not to be sorted in at least one of the available formats of storage;
selecting, from a pool of available reduce operations, a reduce operation based on the size evaluation, wherein the selected reduce operation is configured to accept intermediate key/value pairs that are stored in the selected format, wherein:
  at least one of the available reduce operations is configured to reduce intermediate keys/value pairs that have been sorted; and
  at least one other of the available reduce operations is configured to reduce intermediate keys/value pairs that have not been sorted;
initiating, based on the data processing request, a map operation on the input data by multiple mappers in the mapreduce framework, each of the mappers using an aggregator to partially aggregate the input data into one or more intermediate key/value pairs stored in the selected format;
initiating the selected reduce operation on the intermediate key/value pairs by multiple reducers in the mapreduce framework, each of the reducers using the aggregator to aggregate the intermediate key/value pairs into one or more output values; and
providing the output values in response to the data processing request.

2. The computer-implemented method of claim 1, wherein the mappers and reducers are implemented using a cluster of machines, and wherein the size evaluation takes into account memory space of one or more of the machines.

3. The computer-implemented method of claim 1, wherein the size evaluation takes into account whether the number of keys is three orders of magnitude smaller than the size of the input data.

4. The computer-implemented method of claim 1, wherein the aggregator is based on a commutative and associative aggregate function.

5. A computer program product tangibly embodied in a computer-readable storage device and comprising instructions that when executed by a processor perform a method for processing input data in a mapreduce framework, the method comprising:
  receiving, in the mapreduce framework, a data processing request for input data;
  performing a size evaluation of a number of keys with regard to a size of the input data;
  selecting, from a pool of available formats of storage of intermediate keys/value pairs, a format based on the size evaluation, wherein:
    intermediate keys/value pairs are sorted in at least one of the available formats of storage; and
    intermediate keys/value pairs are not to be sorted in at least one of the available formats of storage;
  selecting, from a pool of available reduce operations, a reduce operation based on the size evaluation, wherein the selected reduce operation is configured to accept intermediate key/value pairs that are stored in the selected format, wherein:
    at least one of the available reduce operations is configured to reduce intermediate keys/value pairs that have been sorted; and
    at least one other of the available reduce operations is configured to reduce intermediate keys/value pairs that have not been sorted;
  initiating, based on the data processing request, a map operation on the input data by multiple mappers in the mapreduce framework, each of the mappers using an aggregator to partially aggregate the input data into one or more intermediate key/value pairs stored in the selected format;
  initiating the selected reduce operation on the intermediate key/value pairs by multiple reducers in the mapreduce framework, each of the reducers using the aggregator to aggregate the intermediate key/value pairs into one or more output values; and
  providing the output values in response to the data processing request.

6. The computer program product of claim 5, wherein the mappers and reducers are implemented using a cluster of machines, and wherein the size evaluation takes into account memory space of one or more of the machines.

7. The computer program product of claim 5, wherein the size evaluation takes into account whether the number of keys is three orders of magnitude smaller than the size of the input data.

8. The computer program product of claim 5, wherein the aggregator is based on a commutative and associative aggregate function.

9. A system comprising:
  at least one processor; and
  at least one computer-readable storage device comprising instructions that when executed cause performance of a method for processing input data in a mapreduce framework, the method comprising:
  receiving, in the mapreduce framework, a data processing request for input data;
  performing a size evaluation of a number of keys with regard to a size of the input data;
  selecting, from a pool of available formats of storage of intermediate keys/value pairs, a format based on the size evaluation, wherein:
    at least one of the available formats of storage in which intermediate keys/value pairs are sorted; and
    at least one of the available formats of storage in which intermediate keys/value pairs are not to be sorted;
  selecting, from a pool of available reduce operations, a reduce operation based on the size evaluation, wherein the selected reduce operation is configured to accept intermediate key/value pairs that are stored in the selected format, wherein:
    intermediate keys/value pairs are sorted in at least one of the available formats of storage; and
    intermediate keys/value pairs are not to be sorted in at least one of the available formats of storage;
  initiating, based on the data processing request, a map operation on the input data by multiple mappers in the mapreduce framework, each of the mappers using an aggregator to partially aggregate the input data into one or more intermediate key/value pairs stored in the selected format;
  initiating the selected reduce operation on the intermediate key/value pairs by multiple reducers in the mapreduce framework, each of the reducers using the aggregator to aggregate the intermediate key/value pairs into one or more output values; and providing the output values in response to the data processing request.

10. The system of claim 9, wherein the mappers and reducers are implemented using a cluster of machines, and wherein the size evaluation takes into account memory space of one or more of the machines.

11. The system of claim 9, wherein the size evaluation takes into account whether the number of keys is three orders of magnitude smaller than the size of the input data.

12. The system of claim 9, wherein the aggregator is based on a commutative and associative aggregate function.

13. The computer-implemented method of claim 1, wherein the map operations stores each of the intermediate key/value pairs into one of a plurality of hash tables by:
   identifying an occurrence of a value in the input data;
   hashing the identified value to generate a key for the identified value; and
   updating an entry of one of a plurality of hash tables at an index of the generated key; and
   wherein those of the intermediate key/value pairs with a common key are handled by a same one of the reducers.

14. The computer-implemented method of claim 13, wherein for each mapper there is a single corresponding hash table; and
   wherein each mapper uses an aggregator to partially aggregate the input data into one or more intermediate key/value pairs in each mapper's corresponding hash table without sorting the intermediate key/value pairs.

15. The computer-implemented method of claim 13, wherein at least some of the multiple mappers use an aggregator to partially aggregate the input data into one or more intermediate key/value pairs in the same hash table without sorting the intermediate key/value pairs.

16. The computer-implemented method of claim 13, wherein updating an entry of a hash table at an index of the generated key comprises incrementing an entry of a hash table at an index of the generated key.

17. The computer program product of claim 5, wherein the map operations stores each of the intermediate key/value pairs into one of a plurality of hash tables by:
   identifying an occurrence of a value in the input data;
   hashing the identified value to generate a key for the identified value; and
   updating an entry of one of a plurality of hash tables at an index of the generated key; and
   wherein those of the intermediate key/value pairs with a common key are handled by a same one of the reducers.

18. The system of claim 9, wherein the map operations stores each of the intermediate key/value pairs into one of a plurality of hash tables by:
   identifying an occurrence of a value in the input data;
   hashing the identified value to generate a key for the identified value; and
   updating an entry of one of a plurality of hash tables at an index of the generated key; and
   wherein those of the intermediate key/value pairs with a common key are handled by a same one of the reducers.

19. The method of claim 1, wherein:
intermediate keys/value pairs are stored in sorted lists in at least one of the available formats of storage; and
intermediate keys/value pairs are stored in hash tables in at least one of the available formats of storage.

20. The computer program product of claim 5, wherein:
intermediate keys/value pairs are stored in sorted lists in at least one of the available formats of storage; and
intermediate keys/value pairs are stored in hash tables in at least one of the available formats of storage.

21. The system of claim 9, wherein:
intermediate keys/value pairs are stored in sorted lists in at least one of the available formats of storage; and
intermediate keys/value pairs are stored in hash tables in at least one of the available formats of storage.

* * * * *